United States Patent [19]

Robinson et al.

[11] Patent Number: 5,257,939
[45] Date of Patent: Nov. 2, 1993

[54] CULTURAL KNOWLEDGE BOARD GAME

[76] Inventors: Don T. Robinson, 10510 Lippitt Ave., Dallas, Tex. 75219; June Huckabee, 150 Crescent, Hood County, Granbury, Tex. 76049

[21] Appl. No.: 944,444

[22] Filed: Oct. 13, 1992

[51] Int. Cl.⁵ .................................................. G09B 19/22
[52] U.S. Cl. ................................. 434/129; 273/236; 273/431; 273/432
[58] Field of Search ................. 273/431, 432, 236; 434/129

[56] References Cited

U.S. PATENT DOCUMENTS

| | | | |
|---|---|---|---|
| 3,883,142 | 5/1975 | Spohn | 273/134 |
| 4,273,337 | 6/1981 | Carrera et al. | 273/243 |
| 4,856,788 | 8/1989 | Fischel | 273/256 |
| 4,928,967 | 5/1990 | Woodliff | 273/254 |
| 4,984,805 | 1/1991 | Medlock | 273/248 |
| 5,048,842 | 9/1991 | Proctor | 273/248 |
| 5,145,184 | 9/1992 | Yearick et al. | 273/248 |

FOREIGN PATENT DOCUMENTS 2226502 7/1990 United Kingdom ................. 273/249

*Primary Examiner*—Gene Mancene
*Assistant Examiner*—L. Thomas
*Attorney, Agent, or Firm*—Richards, Medlock & Andrews

[57] ABSTRACT

The invention provides a board game apparatus for an educational board game, with a plurality of playing cards and playing tokens.

8 Claims, 2 Drawing Sheets 5,257,939

CULTURAL KNOWLEDGE BOARD GAME

TECHNICAL FIELD OF THE INVENTION

This invention relates to a board game apparatus and is intended to provide primarily a game of thought provoking questions and challenges designed to test the participant's knowledge on various education disciplines.

BACKGROUND OF THE INVENTION

In recent years, a number of books and articles have been published bemoaning the lack of cultural literacy and poor educational training within the United States. As a result, a number of question and answer or trivia games have found favor, but none of these games have focused on such a broad range of educational disciplines as the present invention, and none of these games provide a playing format by which the participants may challenge each other's responses to a given question.

Accordingly, it is an object of the present invention to provide an educational and entertaining table game which has as its theme various educational categories, e.g., the Bible, mythology, folklore, literature, philosophy, religion, the arts, world history, United States history, politics, geography, anthropology, psychology, sociology, business, economics, science, health, technology and ethnic history and culture (e.g., American Indian, Afro-American, etc.).

The present invention also provides a table game whereby the object is to be the first participant to acceptably identify and explain, to the satisfaction of other participants or a designated reference source, one topic in each of the educational categories.

SUMMARY OF THE INVENTION

In one aspect of the present invention, a game board apparatus, with a plurality of playing spaces disposed thereon, is provided for playing this educational, cultural literacy game. Each playing space is assigned to a participant and has disposed thereon a plurality of distinct educational categories. The present invention also comprises a plurality of playing cards, wherein one side of each playing card has a plurality of topics, each topic corresponding to an educational category. The present invention further includes a plurality of playing tokens to be assigned to each participant and being equal in number to the number of educational categories on each playing space.

An object of the present invention is to be the first participant to acceptably identify and explain, to the satisfaction of other participants or a designated reference source, one topic in each of the educational categories disposed within that participant's playing space. For example, if the educational category is literature, the topic on the playing card corresponding to literature may be Shakespeare. The participant whose turn it is must then identify and explain, to the satisfaction of other participants or a designated reference source, who Shakespeare was. The first participant to acceptably identify and explain one topic in each of the educational categories on that participant's playing space wins the game.

DETAILED DESCRIPTION

Figure 1:
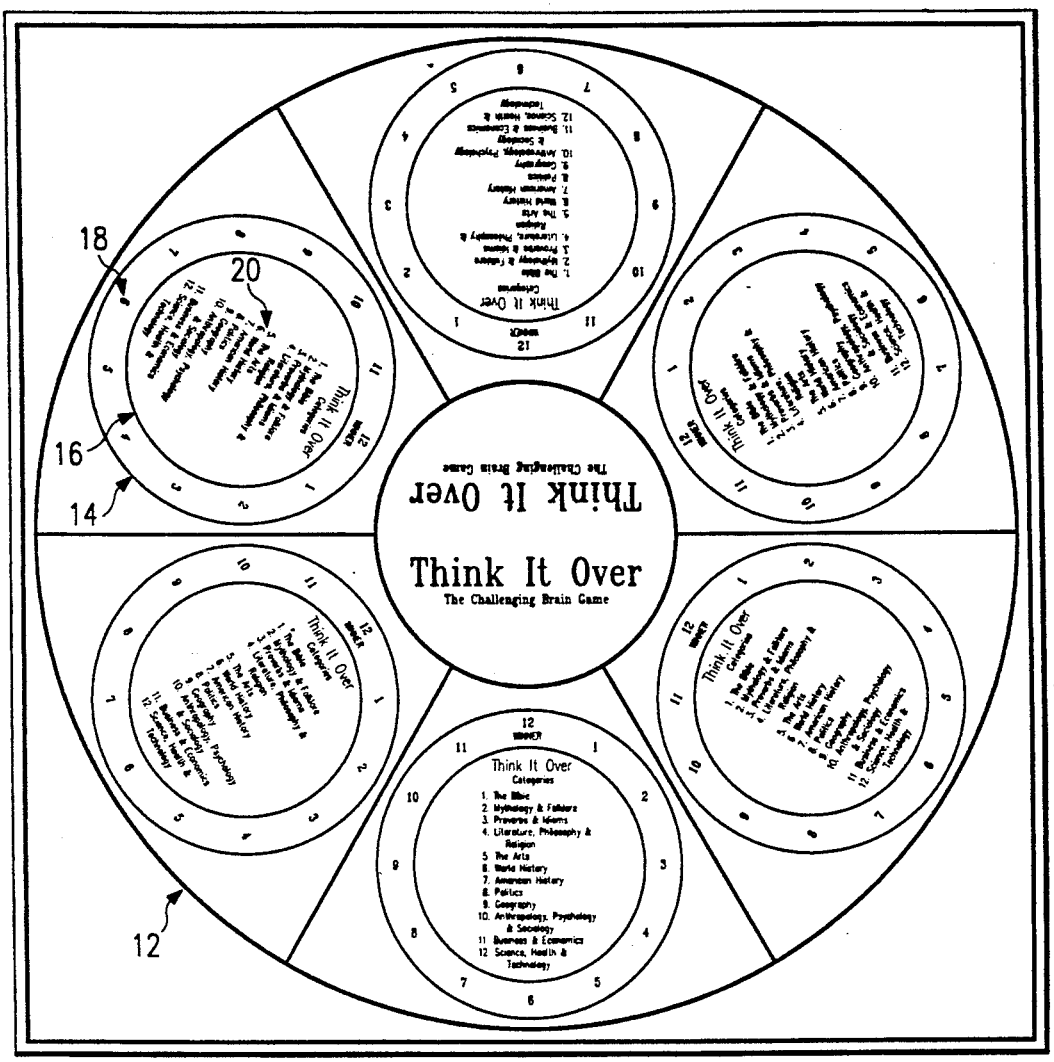
FIG. 1 is a plane view of one form or arrangement of the game board or playing surface for the present invention.

With reference to the drawings, FIG. 1 represents one form of a playing board 10 which comprises a plurality of geometrically shaped playing spaces 12. Preferably, the playing board is divided into six playing spaces, each of which having the same or similar color or preferably being color coded with a respective color. In the board illustrated in FIG. 1, each playing space 12 is a sector of a circle. Generally, at least one of the playing spaces 12 is assigned to each participant. Different versions of this board can have more or fewer playing spaces.

Figures 2, 3A, 3B:
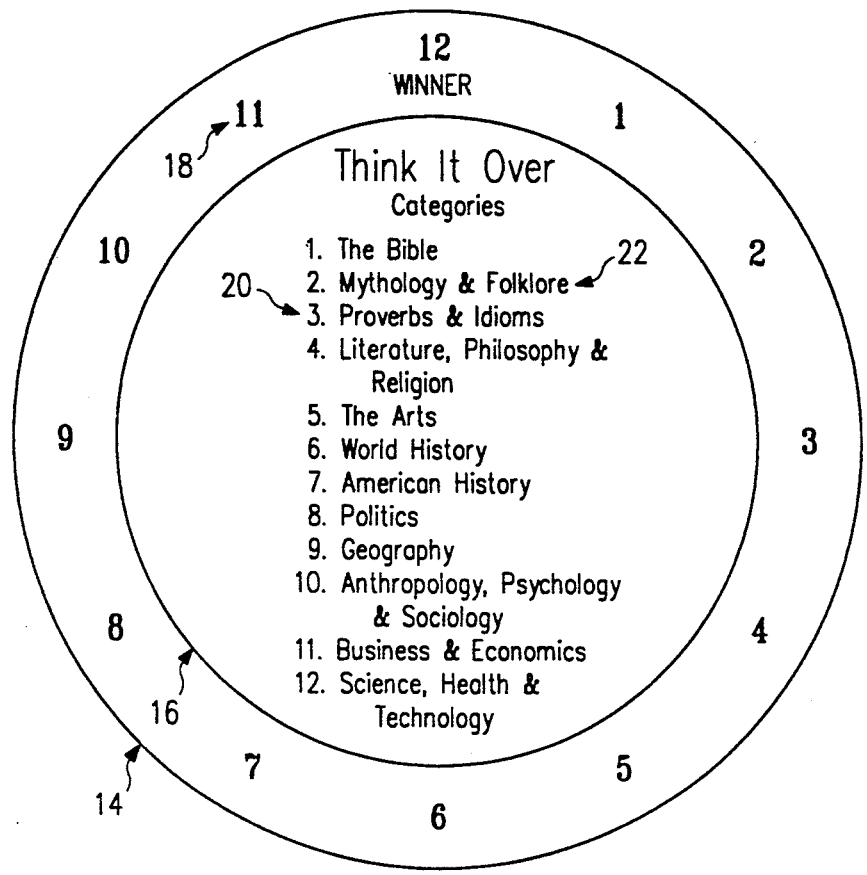
FIG. 2 represents a playing space which has thereon a plurality of educational categories.
FIG. 3a represents one form of a playing card which has thereon a plurality of topics, each topic corresponding to an educational category.
FIG. 3b represents another form of a playing card having thereon a plurality of topics, each topic corresponding to an educational category, and for each topic a reference page corresponding to a designated reference source.

In one embodiment of the present invention and with respect to FIG. 2, each of the playing spaces 12 has thereon at least one geometrical figure, preferably each of the playing spaces 12 has thereon a first and second geometrical figure. Preferably, the first and second geometrical figures are circles and are arranged such that there is a first circle 14 and a second circle 16 wherein the first circle 14 has a greater circumference than the second circle 16 and the second circle 16 is arranged within the first circle 14 such that the first circle 14 and the second circle 16 are concentric. Furthermore, each of the playing spaces 12 have arranged thereon a plurality of alphanumeric symbols, preferably numerals 18. The alphanumeric symbols are preferably arranged in alphanumeric order within the first circle 14 but outside of the second circle 16.

Each of the playing spaces 12 also has arranged thereon a plurality of educational categories 22. Preferably, the educational categories 22 are arranged within the second circle 16 and given an alphanumeric symbol, preferably a number 20 that corresponds to a number 18 disposed outside of the second circle 16. In the alternative to alphanumeric symbols, a character symbol representative of the educational category 22 can be used. For example, a picture of Shakespeare can be used to represent the educational category literature or a picture of a globe can be used to represent the educational category geography. Nonlimiting examples of educational categories 22 include the Bible, mythology, folklore, proverbs, idioms, literature, philosophy, religion, the arts, world history, United States history, politics, geography, anthropology, psychology, sociology, business, economics, science, health, technology, ethnic history, and culture. Different versions of the board game can have more or fewer educational categories and/or a different type of categories, depending on the skill and age level of the participants.

With reference to FIG. 3a, a typical playing card 24 is shown to have at least one topic 26 with an assigned alphanumeric symbol, preferably a number 28 that corresponds to a number 20 assigned to an educational category 22 disposed within the second circle 16 of each of the playing spaces 12, which in turn corresponds to a number 18 disposed outside of the second circle 16 but within the first circle 14. In FIG. 3b, another embodiment of a playing card 24 is shown having, like the playing card in FIG. 3a, at least one topic 26 with an assigned number 28 that corresponds to an educational category 22 disposed within the second circle 16 of each of the playing spaces 12. The playing card 24 in FIG. 3b can also have an alphanumeric symbol, preferably a reference numeral 30 that corresponds to a page number in a designated reference source, thus allowing the participants to quickly verify the response. The reference source can be an encyclopedia, a dictionary or any other suitable reference source. Preferably, the reference source is *Cultural Literacy*, by E. D. Hirsch, Jr., Joseph F. Kett, and James Trefil (Houghton Mifflin Company, 1988).

Figure 4:
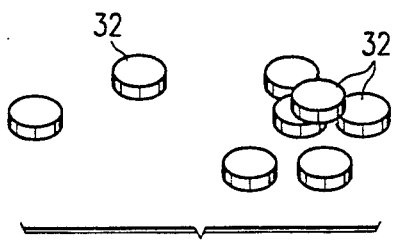
FIG. 4 represents a plurality of playing tokens.

With reference to FIG. 4, a plurality of playing tokens 32 is represented. Each participant can be assigned at least one playing token, preferably each participant is assigned a number of playing tokens 32 equal in number to the number of educational categories 22 disposed on the participant's playing space 12. The color of each participant's playing tokens 32 can be the same, but preferably corresponds to the unique color of the participant's playing space 12.

The game is preferably played in the following fashion:

The object of the game is to be the first participant to acceptably explain or identify, to the satisfaction of other participants or a designated reference source, one topic 26 in each of the educational categories 22 listed on each participant's playing space 12. Preferably, the topics 26 can be identified in alphanumeric order but can also be in random order. Each participant's acceptable response allows him/her to cover the corresponding educational category number 18 on his/her playing space 12 with a playing token 32. Further, each participant must provide a response in a given amount of time, preferably one minute. A timer device is provided for timing each participant's response. Preferably, the timer device is a sand-filled timer, but a watch or clock or other comparable timer device can be suitable.

The number of participants or teams of participants which can play at one time can be any number between two and the number of playing spaces 12, both inclusive. Each participant or team chooses a particular playing space 12 color from those available and is provided with color matching playing tokens 32 to cover the corresponding numbers 18 as the responses of that participant or team are given and accepted. The playing cards 24 can be stacked face down in the middle of the game board 10 and a sand-filled timer is cleared and ready to be inverted. The participants can agree among themselves as to who begins the game or each participant may roll a die with the highest roll of the die determining who goes first. This participant draws a playing card 24 and reveals to the other participants any one topic 26 on that playing card 24. Preferably, this participant reveals a topic corresponding to the number one ("1") on the playing card 24. After revealing a topic 26 to the other participants, the sand-filled timer is inverted and the game begins. The topic 26 must then be identified and explained by that participant to the satisfaction of the other participants or a designated reference source.

The participant who drew the playing card 24 has one minute to acceptably provide one explanation or description of the topic 26 that participant chose on the drawn playing card 24. If the other participants approve of the response as acceptable, the responding participant covers the corresponding number 18, on the responding participant's playing space 12, with a token 32 and then moves the playing card 24 to the bottom of the playing card stack.

Moving either clockwise or counterclockwise, it now becomes the turn of the next participant, who draws the top playing card 24 from the playing card deck and repeats the process of attempting to acceptably identify and explain any one topic on the playing card drawn.

Each response given by any participant can be challenged by any other participant as being unacceptable. After a participant's response is challenged, the response must be verified either by looking the response up in the designated reference source or by a discussion and agreement among the non-responding participants. If the response proves to be acceptable and the challenge is overcome, the challenging participant is penalized and either must remove his/her last earned token 32 or lose his/her next turn. If the challenge is not overcome, the responding participant does not receive a token 32 and the next participant takes his/her turn.

The game continues until a participant acceptably identifies and explains one topic 26 in each of the educational categories 22. The first participant to accomplish this objective wins the game.

It is understood that the above rules as well as the other components of the present disclosure dealing with the embodiments of the game, have been made only by way of example and can be developed further or even radically changed. These modifications and variations, however, will not change the spirit and basic principles of the present disclosure.

We claim:

1. An educational board game for a plurality of participants designed to enhance the knowledge of said participants, comprising:

a board game apparatus acting as a playing surface having a plurality of playing spaces, each of said playing spaces having thereon a plurality of indicia, each of said indicia representing a different educational category;

a plurality of playing cards with one side of each of said playing cards having thereon a plurality of topics, with each of said topics corresponding to a respective one of said indicia on said playing spaces; and a plurality of tokens such that the number of said plurality of tokens assignable to each of said participants is at least equal to the total number of said indicia on a playing space.

2. An educational board game as in claim 1, wherein each of said playing spaces has thereon a first geometrical figure and a second geometrical figure, said first geometrical figure having a greater circumference than said second geometrical figure, said second geometrical figure being arranged within said first geometrical figure such that said first geometrical figure and said second geometrical figure share a common center.

3. An educational board game as in claim 2, wherein each of said playing spaces has a plurality of alphanumeric symbols being arranged within the first geometrical figure and outside of the second geometrical figure of the respective playing space.

4. An educational board game as in claim 3 wherein said alphanumeric symbols are arranged in alphanumeric order and are equally spaced concentrically around said second geometrical figure.

5. An educational board game as in claim 2 wherein each of said playing spaces has a plurality of character symbols arranged within the first geometrical figure and outside of the second geometrical figure of the respective playing space.

6. An educational board game as in claim 1, wherein said plurality of indicia and corresponding said educational category on said playing space are arranged outside of the second geometrical figure and within said playing space.

7. An educational board game as in claim 1, wherein said plurality of indicia and corresponding educational category on said playing space are arranged within said second geometrical figure.

8. An educational board game as in claim 1, wherein said educational category on each of said playing spaces comprise literature, philosophy, religion, mythology, the arts, world history, United States history, politics, geography, anthropology, psychology, sociology, economics, science, the Bible and ethnic history and culture.

* * * * *